(12) United States Patent
Sinclair

(10) Patent No.: US 8,448,326 B2
(45) Date of Patent: May 28, 2013

(54) METHOD OF MANUFACTURING AN ACCELEROMETER

(75) Inventor: Michael J. Sinclair, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 2306 days.

(21) Appl. No.: 11/166,636

(22) Filed: Jun. 24, 2005

(65) Prior Publication Data
US 2006/0227984 A1 Oct. 12, 2006

Related U.S. Application Data

(60) Provisional application No. 60/669,754, filed on Apr. 8, 2005.

(51) Int. Cl.
*H04R 31/00* (2006.01)

(52) U.S. Cl.
USPC ........... 29/594; 29/592.1; 29/609.1; 257/703; 257/723; 257/724; 257/729; 257/730; 381/358; 381/360; 381/361; 381/368; 381/369

(58) Field of Classification Search
USPC .............. 29/592.1, 594, 609.1; 381/170, 174, 381/355, 358, 360, 361, 368, 369; 257/704, 257/723, 724, 729, 730
See application file for complete search history.

(56) References Cited

U.S. PATENT DOCUMENTS

| | | | | |
|---|---|---|---|---|
| 4,281,222 A | * | 7/1981 | Nakagawa et al. | 381/357 |
| 5,366,664 A | * | 11/1994 | Varadan et al. | 252/512 |
| 6,898,292 B2 | * | 5/2005 | Tanabe et al. | 381/191 |
| 2003/0068055 A1 | * | 4/2003 | Tanabe et al. | 381/191 |
| 2004/0255679 A1 | * | 12/2004 | Valderrama Reyes et al. | 73/649 |

OTHER PUBLICATIONS

Siegel, "Radioear Bone Conduction Headsets," Oltec Today, Jul. 2003.
http://www.amalgamate2000.com/sales/bone_conduction_microphone%20non%20vox.htm, 2004.
http://www.jawbone.com, 2004.

* cited by examiner

*Primary Examiner* — Paul D Kim
(74) *Attorney, Agent, or Firm* — Westman, Champlin & Kelly, P.A.; Theodore M. Magee

(57) ABSTRACT

An electret accelerometer is provided in which a diaphragm, an electret, a back plate and an electronic circuit are placed in a casing and the casing is sealed to isolate the diaphragm from external acoustic signals.

6 Claims, 10 Drawing Sheets

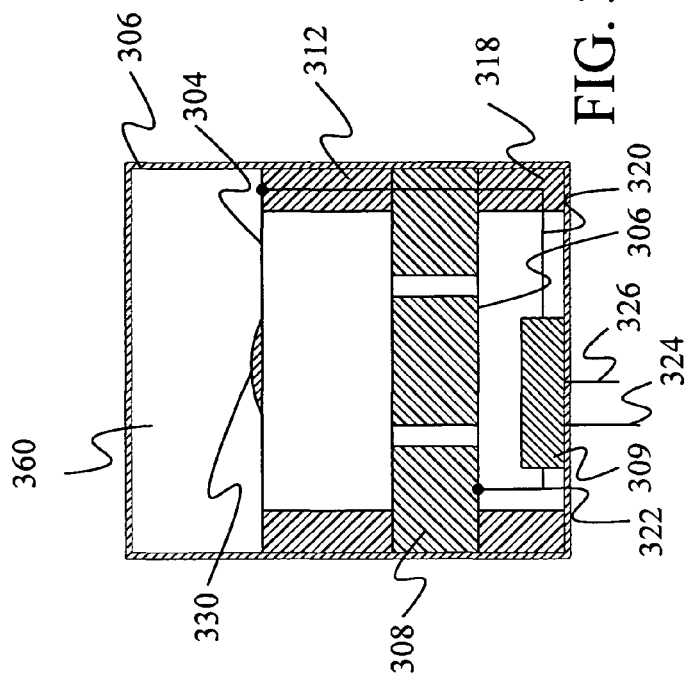
FIG. 3
FIG. 4
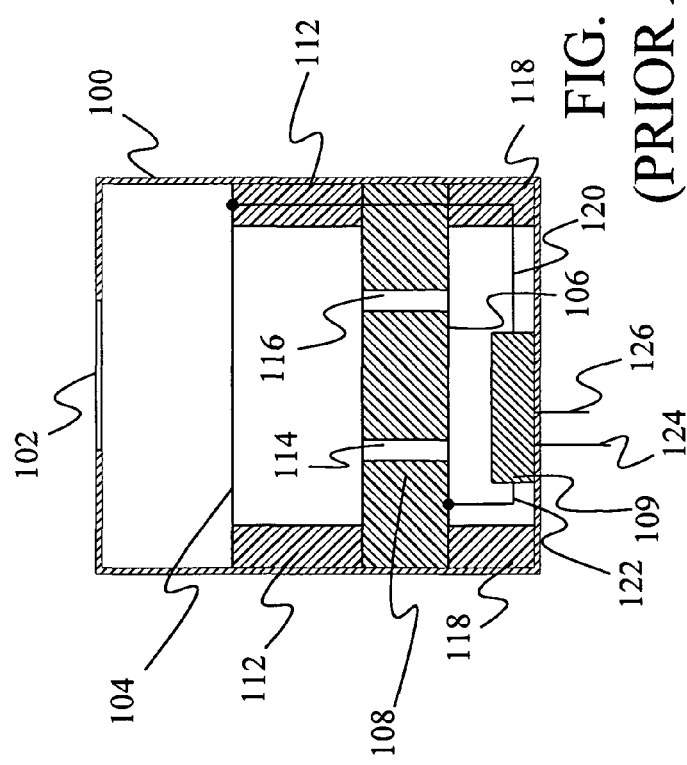
FIG. 1
(PRIOR ART)
FIG. 2
(PRIOR ART)

METHOD OF MANUFACTURING AN ACCELEROMETER

REFERENCE TO RELATED APPLICATIONS

This application claims the priority benefit of U.S. provisional application 60/669,754 filed on Apr. 8, 2005 and entitled ELECTRET-BASED ACCELEROMETER.

BACKGROUND OF THE INVENTION

The present invention relates to accelerometers. In particular, the present invention relates to electret-based accelerometers.

An accelerometer is a sensor that provides an electrical signal that is indicative of the acceleration experienced by the sensor. Examples of accelerometers include potentiometric, capacitive, inductive, optical and piezoelectric.

A capacitive accelerometer measures acceleration based on a change in the capacitance of some element in the sensor. One type of capacitive accelerometer is known as an electret-based accelerometers.

An electret-based accelerometer contains an electret, which is a permanently charged material that is an analogue to a permanent magnet. This permanently charged material is placed between a base plate and a metalized flexible diaphragm to form a charged capacitor. Either the base plate or the diaphragm is connected to a JFET transistor. As the diaphragm moves relative to the rest of the accelerometer, the capacitance of the capacitor changes thereby changing the output voltage of the JFET.

Under the prior art, electret accelerometers have been prone to producing noisy accelerometer signals especially in acoustically noisy environments. Thus, it is desirable to reduce the level of noise in the accelerometer signals.

Accelerometers are also relatively expensive to produce compared to other sensors found in electronic devices. As a result, it is desirable to reduce the cost of manufacturing accelerometers.

SUMMARY OF THE INVENTION

An electret accelerometer is provided in which a diaphragm, an electret, a back plate and an electronic circuit are placed in a closed casing.

BRIEF DESCRIPTION OF THE DRAWINGS

FIG. 1 is a cross-sectional view of a prior art electret microphone.

FIG. 2 is a top view of a prior art electret microphone.

FIG. 3 is a cross-sectional of an electret accelerometer under an embodiment of the present invention.

FIG. 4 is a top view of the electret accelerometer of FIG. 3.

DETAILED DESCRIPTION OF ILLUSTRATIVE EMBODIMENTS

Figure 6:
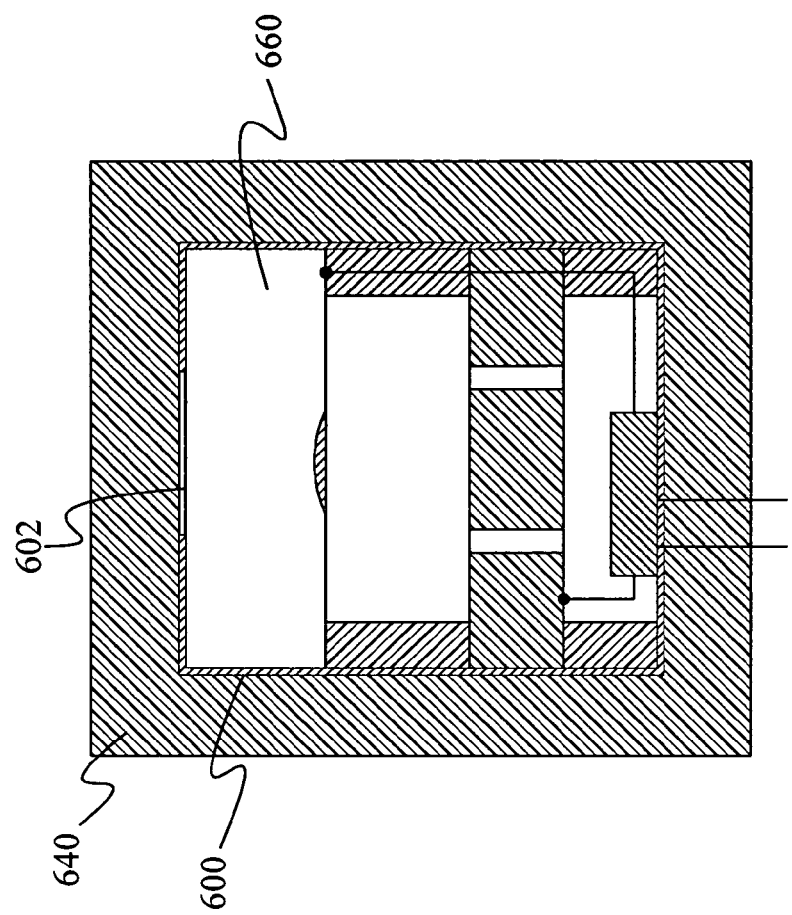
FIG. 6 is a cross-sectional view of a third embodiment of an electret accelerometer under the present invention.

The present invention provides a low-cost accelerometer that is formed by modifying an electret microphone. Electret microphones have been the focus of a significant amount of engineering in an effort to reduce the costs of producing them. This considerable effort has reduced the price point for electret microphones. Accelerometers, on the other hand, continue to be relatively expensive compared to electret microphones.

FIG. 1 provides a cross section of a prior art electret microphone. The microphone includes a casing 100 that has an opening 102. FIG. 2 provides a top view of the electret microphone showing opening 102 in casing 100. In typical electret microphones, casing 100 is around 6 mm in diameter and 5 mm high.

Within casing 100, the outer periphery of a metalized diaphragm 104 is attached to a spacer 112 such that the center of diaphragm 104 can move relative to the periphery. Metalized diaphragm 104 is designed to have a weight-to-flexibility ratio such that movement of container 100 does not induce relative movement between diaphragm 104 and container 100. The space above and below diaphragm 104 contains air.

Below spacer 112 is an electret 108. Electret 108 extends across the interior of casing 100 and is a statically charged non-conducting material. On the bottom surface of electret 108 is a metalized back plate 106. A number of holes, such as holes 114 and 116, extend through electret 108 and back plate 106 to allow air to pass though the electret and back plate when diaphragm 104 moves relative to electret 108.

Electret 108 and back plate 106 are supported by a spacer 118, which creates a space for an electronics circuit 109. Often, electronics circuit 109 is just a single Junction Field-Effect Transistor (JFET). Electronics circuit 109 is connected to metalized diaphragm 104 by a conductor 120 and is connected to metalized back plate 106 by a conductor 122. Electronics circuit 109 is powered by and provides a signal along output conductors 124 and 126, which are typically connected to an external bias circuit. Note that in some systems, three or more power/output conductors are provided to electronics circuit 109.

During operation, acoustic waves pass through opening 102 and cause diaphragm 104 to move. This movement changes the capacitance of a capacitor formed by diaphragm 104 and backplate 106. Because of electret 108, this change in capacitance appears as a change in voltage. Electronics circuit 109 amplifies this voltage change along output conductors 124 and 126.

The present invention forms an accelerometer out of the electret microphone of FIG. 1 by changing the weight-to-flexibility ratio of the diaphragm such that relative motion is created between the diaphragm and the casing when the casing is moved. In this case, the added weight causes the diaphragm to be inertially grounded above DC. In addition, in some embodiments, the diaphragm is acoustically isolated so that it does not move in response to acoustic signals.

FIG. 3 provides a cross-sectional view of one embodiment of the present invention. In FIG. 3, a weight 330 has been added to a diaphragm from an electret microphone to form diaphragm 304. In one embodiment, weight 330 is circular, is centered on diaphragm 304, and has a mass of 7.5 mg. The extra mass of weight 330 changes the mass-to-flexibility ratio of the diaphragm thereby allowing it to be used as an accelerometer. Specifically, the extra mass causes the diaphragm to move relative to the casing when the casing is moved.

To prevent acoustic interference in the accelerometer, the accelerometer of FIG. 3 has a solid casing 300. Casing 300 does not include a hole above the diaphragm. Thus, hole 102 of the electret microphone of FIG. 1 is removed in the accelerometer of FIG. 3. This can be seen more clearly in the top view of FIG. 4. The casing has a diameter of 6 mm and a height of 5 mm under one embodiment of the invention.

The other components of the accelerometer of FIG. 3 are the same as the components found in an electret microphone. For example, electret 308, spacers 312 and 318, backplate 306, electronics 309 and conductors 320, 322, 324, and 326 are the same type of components that are found in the electret microphone of FIG. 1 and are constructed in the same manner as the components of FIG. 1. The complete mass of entire accelerometer is approximately 226 mg.

The accelerometer of FIG. 3 functions in a manner similar to the electret microphone of FIG. 1 except that it detects acceleration of the casing normal to the diaphragm instead of acoustic waves. In particular, as casing 300 is moved, diaphragm 304 moves relative to the casing. This relative movement changes the capacitance of the capacitor formed by diaphragm 304 and back plate 306 thereby creating a change in the voltage on the output conductors.

By using many of the same components and construction techniques used to form electret microphones, the accelerometer of the present invention leverages the knowledge and efficiencies of scale that have been achieved for electret microphones to make a low-cost accelerometer. In addition, it results in an accelerometer that has no static (DC) response. This is different from many modern accelerometers that provide signals even when there is no acceleration.

Figure 5:
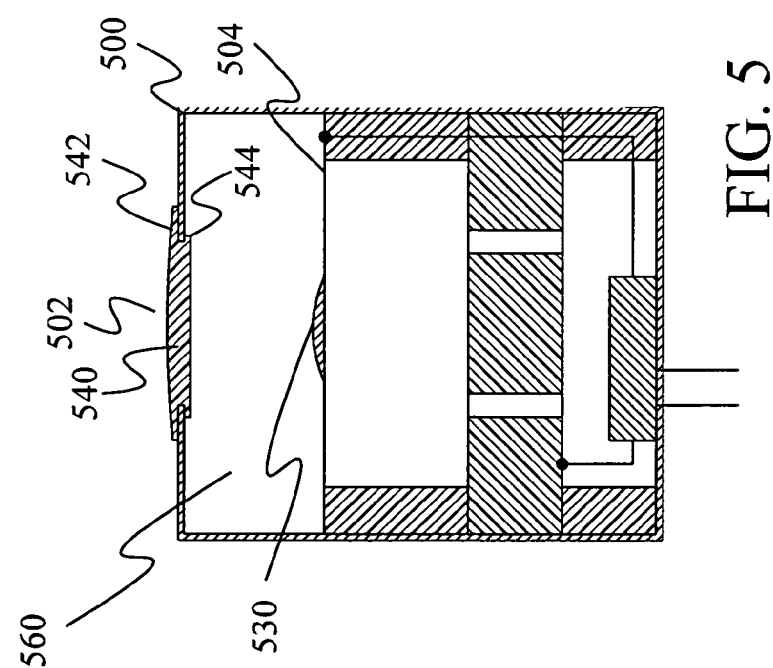
FIG. 5 is a cross-sectional view of a second embodiment of an electret accelerometer under the present invention.

FIG. 5 provides a cross-sectional view of an alternative embodiment of the accelerometer of the present invention. The accelerometer of FIG. 5 is identical to the accelerometer of FIG. 3, except that a casing 500 is used that has a hole 502. Thus, the accelerometer includes a diaphragm 504 with an added weight 530 as found in the accelerometer of FIG. 3.

Casing 500 is the same type of casing that is used in an electret microphone. To isolate diaphragm 504 from acoustic noise, a plug 540 is inserted in hole 502. Plug 540 includes an outer seal 542 and an inner seal 544 that engage the casing to keep plug 540 in place. Although not labeled, the other components of the accelerometer of FIG. 5 are constructed in the same manner and operate in the same manner as the embodiment of FIG. 3.

FIG. 6 provides a cross-sectional view of another embodiment of the present invention. In FIG. 6, the accelerometer is similar to the accelerometer of FIG. 5 except that instead of using plug 540, the entire casing 600 is encased in an acoustic insulating material 640, which covers opening 602. Under some embodiments, this acoustic insulating material is an acrylic. Those skilled in the art will recognize that the thickness of the acrylic can be selected based on the overall desired size for the electret accelerometer and the degree to which the electret accelerometer is to be isolated from acoustic signals. In one embodiment, the acoustic insulating material has a mass of 163 mg.

The acoustic insulating material may be formed in two parts with casing 600 being inserted within the two parts. Alternatively, the acoustic insulating material may be applied to the casing and then cured. For example, a thin covering may be placed over hole 602 and then casing 600 can be repeatedly dipped in a liquid form of the insulating material to build up a thick layer of insulating material on the casing.

Figure 7:
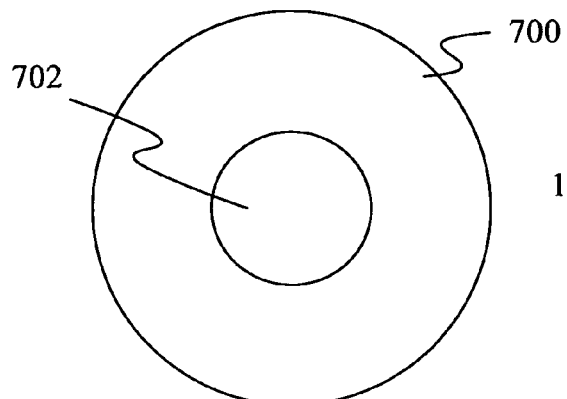
FIG. 7 is a top view of one embodiment of a weighted diaphragm of the present invention.
Figure 8:
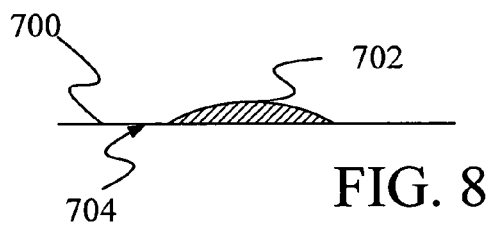
FIG. 8 is a cross-sectional view of the weighted diaphragm of FIG. 7.

FIGS. 7 and 8 provide a top view and a side cross-sectional view, respectively, of a diaphragm for an electret accelerometer under one embodiment of the present invention. The diaphragm of FIG. 7 includes a flexible material 700 and a weight 702. Flexible material 700 includes a metalized layer 704.

Figure 9:
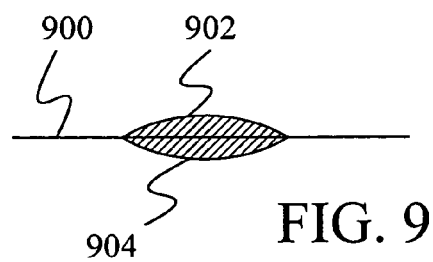
FIG. 9 is a cross-sectional view of an alternative weighted diaphragm.

FIG. 9 shows a side cross-sectional view of an alternative embodiment of a diaphragm for an electret accelerometer under the present invention. In FIG. 9, a flexible material 900 has two masses 902 and 904 placed on it. Each of the masses 902 and 904 are circular in nature and are substantially centered on the round flexible material 900. In the embodiment of FIG. 9, mass 904 is preferably coated with a metallic layer or formed completely of a metallic material so as to form part of the capacitor required for the electret accelerometer.

Figure 10:
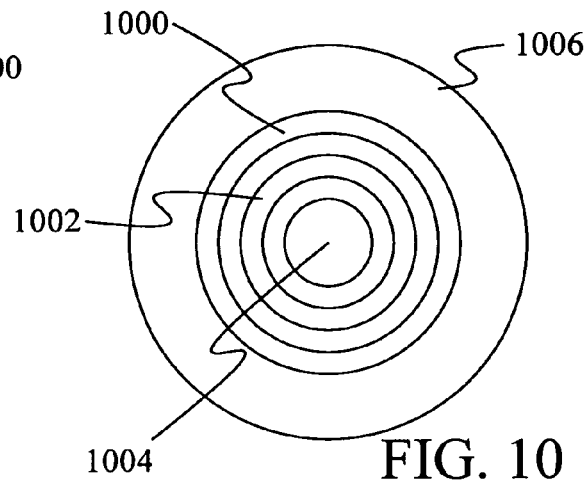
FIG. 10 is a top view of another embodiment of a weighted diaphragm of the present invention.
Figure 11:
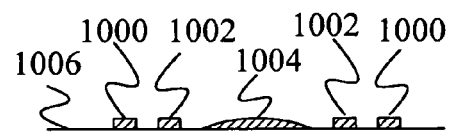
FIG. 11 is a cross-sectional view of the weighted diaphragm of FIG. 10.

FIGS. 10 and 11 provide a top view and a side cross-sectional view, respectively, of another embodiment of a diaphragm of an electret accelerometer under the present invention. In the diaphragm of FIGS. 10 and 11, concentric mass rings 1000 and 1002 are placed around a center mass 1004 on a flexible material 1006.

Figure 12:
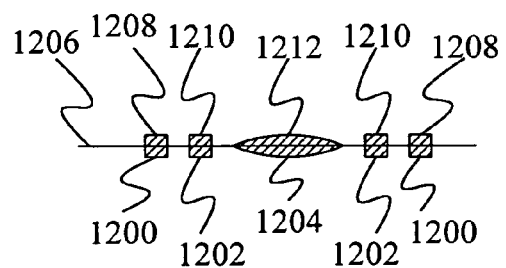
FIG. 12 is a cross-sectional view of a further embodiment of a weighted diaphragm under the present invention.

FIG. 12 provides a side cross-sectional view of an additional embodiment of a diaphragm under the present invention. In FIG. 12, concentric mass rings 1200 and 1202 and center mass 1204 are placed on one side of a flexible diaphragm 1206 and concentric mass rings 1208 and 1210 and center mass 1212 are placed on the other side of the flexible material 1206.

Figure 13:
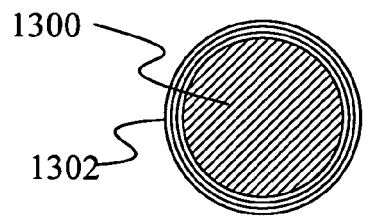
FIG. 13 is a top view of another embodiment of a weighted diaphragm of the present invention.
Figure 14:
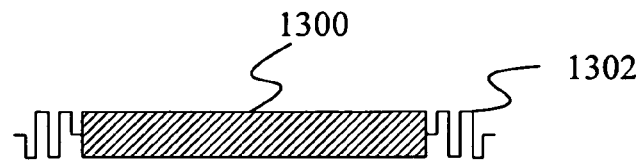
FIG. 14 is a cross-sectional view of the weighted diaphragm of FIG. 13.

FIGS. 13 and 14 provide a top view and a side cross-sectional view of a diaphragm of an additional embodiment of the present invention. In FIG. 13, a circular rigid diaphragm 1300 with increased mass is attached to the spacers of the accelerometer by a compliant support 1302 around the periphery of diaphragm 1300. Diaphragm 1300 is metalized and provides a large flat surface area to improve the output of the accelerometer. Compliant support 1302 can be constructed of any compliant material such as rubberized fabric such as in speaker cones or concentrically corrugated Mylar.

Although specific designs for the placement of added mass on the diaphragm have been show, those skilled in the art will recognize that other patterns are possible and within the scope of the present invention. In addition, instead of adding mass to the diaphragm, manufacturing steps could be taken to increase the flexibility of the diaphragm while keeping its mass the same. This would have the same effect of increasing the mass-to-flexibility ratio of the diaphragm thereby making it useable in an accelerometer.

Figure 15:
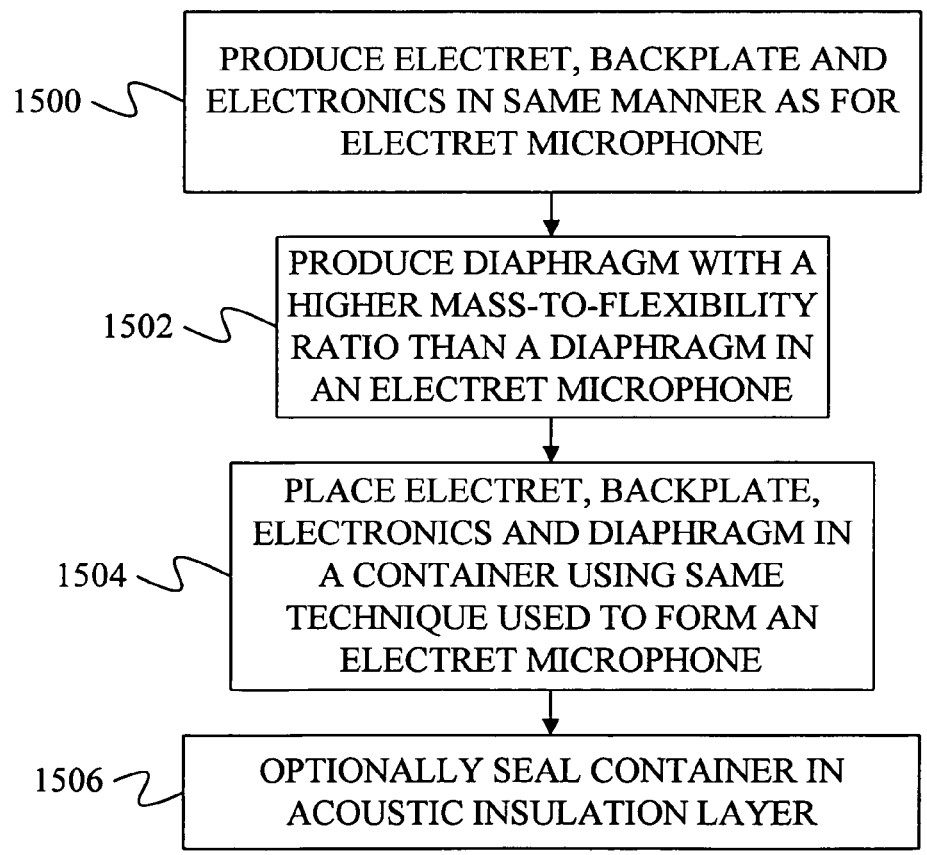
FIG. 15 is a flow diaphragm of a method of constructing an electret accelerometer.

FIG. 15 provides a flow diagram for constructing an electret accelerometer under the present invention. In step 1500, the electret, the backplate and the electronics are manufactured in the same manner as they would be manufactured for an electret microphone. In step 1502 a diaphragm with a higher mass-to-flexibility ratio than a diaphragm for an electret microphone is formed. In step 1504, the electret, backplate, electronics and diaphragm are placed in a container using the same techniques that are used in forming an electret microphone. At step 1506, the container is optionally sealed with an acoustic insulation, for example, plug 540 or acoustic insulating material 640.

Figure 16:
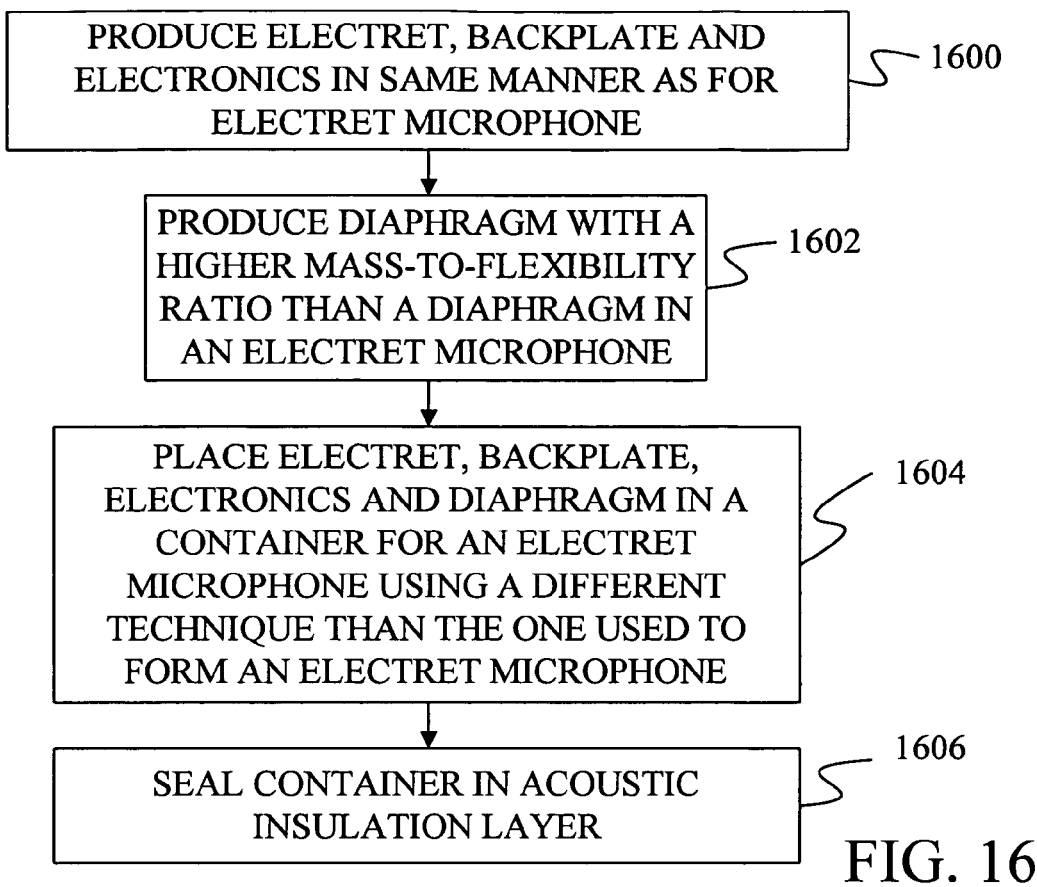
FIG. 16 is an alternative method of manufacturing an electret accelerometer under the present invention.

FIG. 16 provides an alternative method for producing an electret accelerometer under the present invention. In step 1600, the electret, backplate and electronics of the accelerometer are produced in the same manner that they would be produced for an electret microphone. At step 1602 a diaphragm is produced that has a greater weight-to-flexibility ratio than diaphragms found in electret microphones. At step 1604, the electret, backplate, electronics, and diaphragm are inserted into the same canister used for an electret microphone using a different technique than is used to form an electret microphone so as to accommodate the different diaphragm produced in step 1602. At step 1606, the canister is sealed so that the diaphragm is not affected by acoustic waves.

Figure 17:
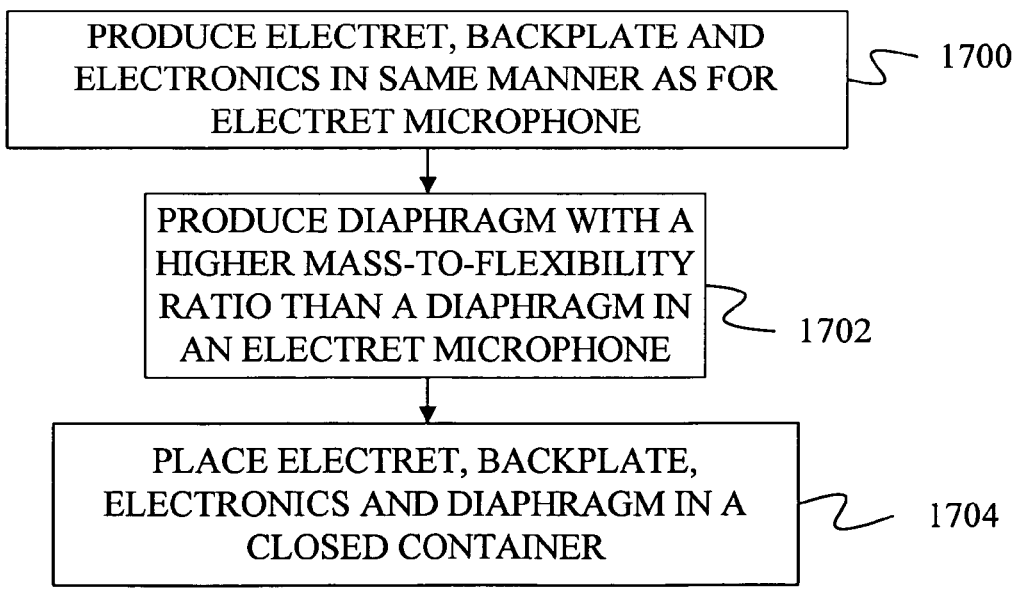
FIG. 17 is a third method of manufacturing an electret accelerometer under the present invention.

FIG. 17 provides an alternative method for forming the electret accelerometer of the present invention. In step 1700, the electret, the backplate and electronics are produced in the same manner as they would be produced for an electret microphone. At step 1702, a diaphragm is produced that has a greater weight-to-flexibility ratio than the diaphragms used in electret microphones. At step 1704, the electret, backplate, electronics, and diaphragm are inserted into a closed canister such as the canister of FIG. 3.

In further embodiments, the electret-based accelerometers described above are manufactured with a dampening material, such as a viscoelastic material or liquid, placed within the casing so that the dampening is in contact with both the casing and the diaphragm. For example, the dampening material may be placed in space 360 of FIG. 3, space 560 of FIG. 5, and space 660 of FIG. 6. This dampening material may be added after the diaphragm is placed in the casing but before the casing is sealed or may be placed in a closed canister before the diaphragm in embodiments such as shown in FIG. 17. The dampening material dampens the frequency response of the diaphragm and helps to reduce resonance at certain frequencies.

The accelerometer of the present invention may be used in any desired application. The present inventors have found that the accelerometer is especially useful as a bone-conduction microphone, which detects vibrations of a user's head or throat when the user speaks.

Figure 18:
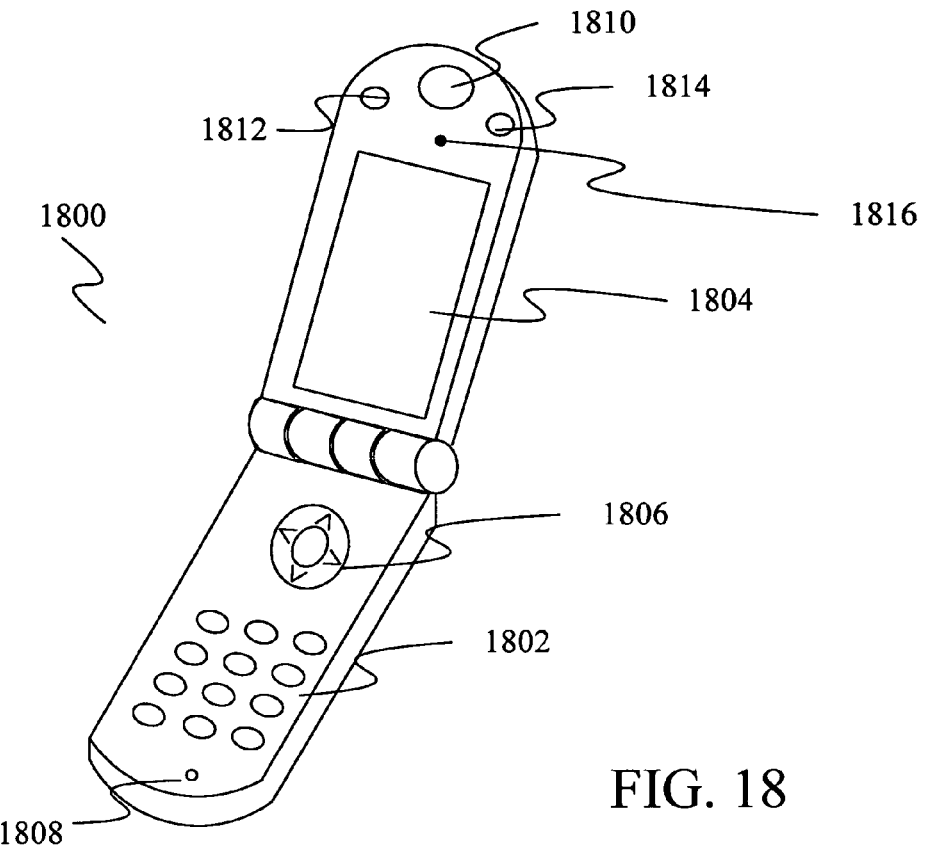
FIG. 18 is a perspective view of a mobile device in which an accelerometer of the present invention may be used.

FIG. 18 provides an example of a mobile phone 1800 that could use the accelerometer of the present invention as a bone-conduction microphone. Mobile phone 1800 includes a key pad 1802, a display 1804, a cursor control 1806, an air conduction microphone 1808, a speaker 1810, two bone-conduction microphones 1812 and 1814, and optionally a proximity sensor 1816. Bone-conduction microphones 1812 and 1814 consist of one of the accelerometer embodiments described above. Mobile phone 1800 also includes a power source such as a battery, a processor, a global positioning satellite signal detector and processor, which are not visible from the exterior of the phone. Optionally, mobile phone 1800 may also include a pulse sensor, an oximetry sensor, a temperature sensor, and a video camera.

Keypad 1802 allows the user to enter numbers and letters into the mobile phone. In other embodiments, keypad 1802 is combined with display 1804 in the form of a touch screen. Cursor control 1806 allows the user to highlight and select information on display 1804 and to scroll through images and pages that are larger than display 1804.

Figures 19, 20:
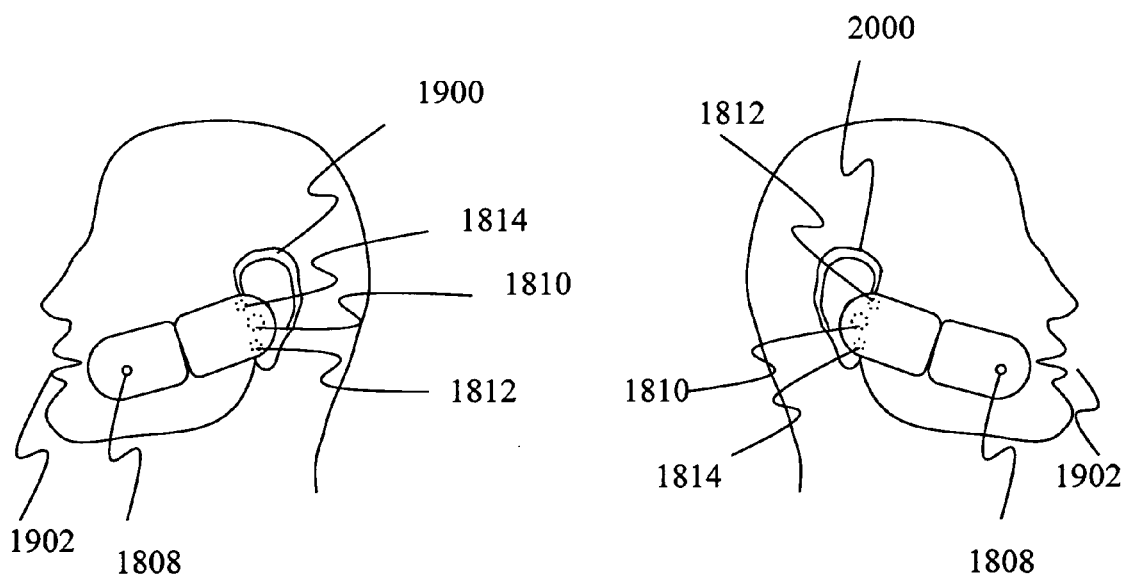
FIG. 19 shows the phone of FIG. 18 in position on the left side of a user's head.
FIG. 20 shows the phone of FIG. 18 in position on the right side of a user's head.

As shown in FIGS. 19 and 20, when mobile phone 1800 is put in the standard position for conversing over the phone, speaker 1810 is positioned near the user's left ear 1900 or right ear 2000, and air conduction microphone 1808 is positioned near the user's mouth 1902. When the phone is positioned near the user's left ear, as in FIG. 19, bone conduction microphone 1814 contacts the user's skull or ear and produces an alternative sensor signal that provides information about speech that can be used to remove noise from the speech signal received by air conduction microphone 1808. For example, the information provided in the alternative sensor signal can include whether the user is speaking as well as low frequency information related to the user's speech. When the phone is positioned near the user's right ear, as in FIG. 20, bone conduction microphone 1812 contacts the user's skull or ear and produces an alternative sensor signal that can be used to remove noise from the speech signal.

Figure 21:
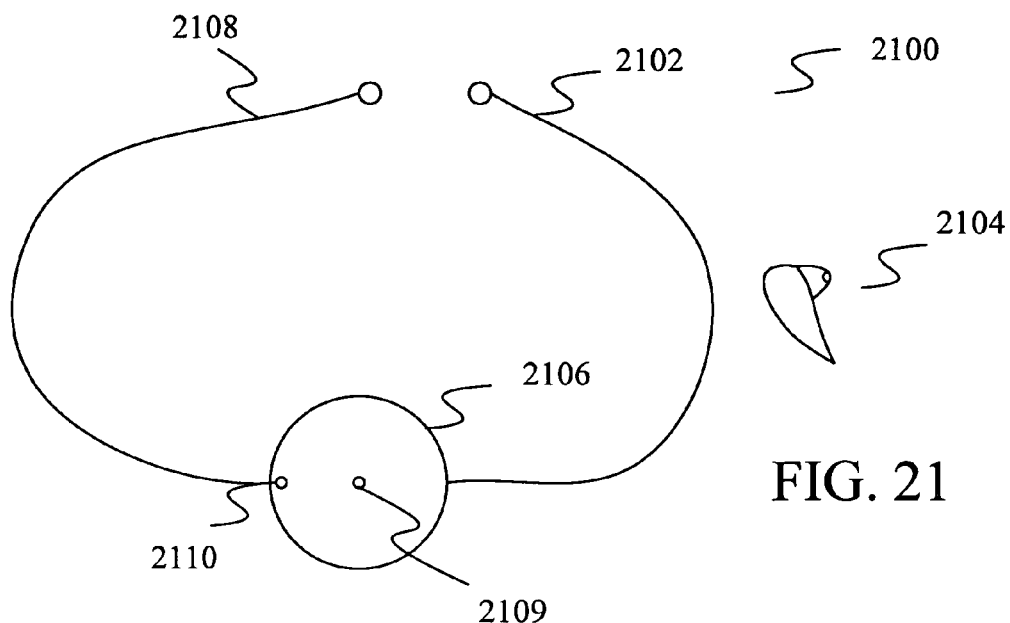
FIG. 21 is a front view of a necklace embodiment of a mobile device in which an accelerometer of the present invention may be used.
Figure 22:
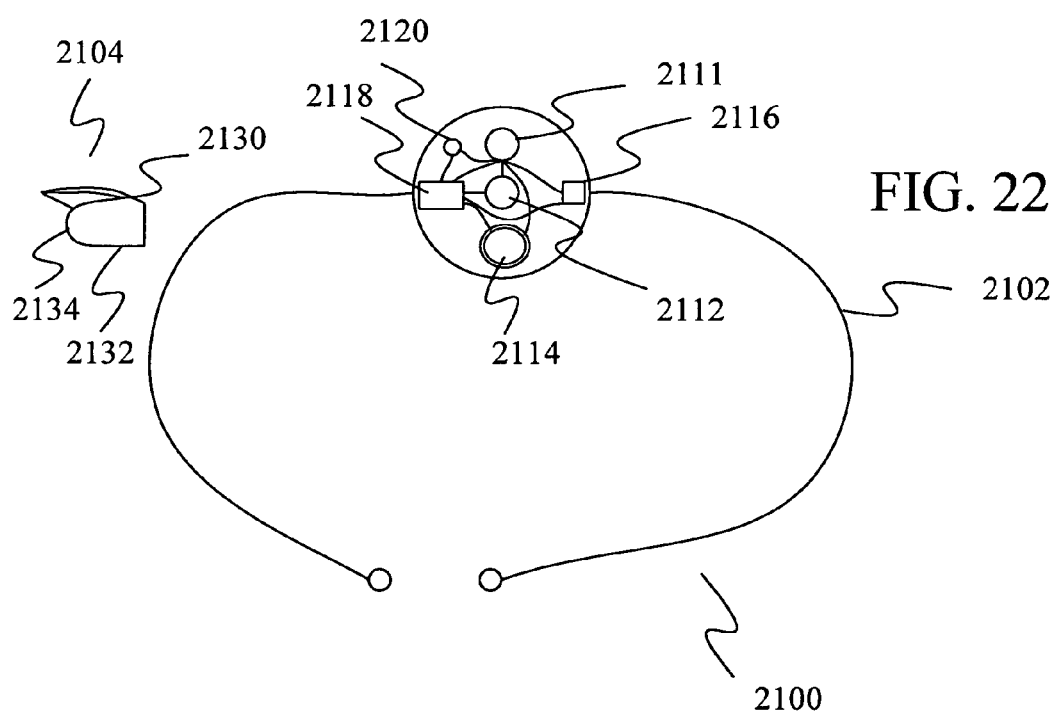
FIG. 22 is a back view of the necklace of FIG. 21.

FIGS. 21 and 22 show a front view and a back view of another mobile device in which an accelerometer of the present invention may be used. In FIGS. 21 and 22, mobile device 2100 consists of a necklace or choker 2102 and an ear bud 2104. Necklace 2102 includes a decorative/ornamental disk or pendant 2106 that is suspended from a neck engaging piece 2108, such as a string or a wire. The neck engaging piece supports the mobile device on the user and is designed to be attached around a user's neck. Decorative disk 2106 includes a microphone opening 2109 and a video opening 2110.

As shown from the back view of FIG. 22, mobile device 2100 includes a battery 2111, which powers an air conduction microphone 2112, an accelerometer of the present invention 2114, a video camera 2116, a processing chip set 2118, and a global positioning satellite (GPS) receiver 2120. Processing chip set 2118 is connected to air conduction microphone 2112, accelerometer 2114, video camera 2116, and GPS receiver 2120. Processing chip set 2118 includes a processor, memory storage, and input/output interface and a communication interface. The communication interface allows the processor to communicate with a processor within ear bud 2104, allowing the processor in processing chip set 2118 to transmit electrical signals representing acoustic information to ear bud 2104. The communication interface of processing chip set 2118 may also wirelessly communicate with a collection of other devices, including a video display, a personal computer, a router, and other mobile devices. The protocol used for these communications can include any known protocol, including any variations of the 802.11 protocol.

Ear bud 2104 includes outer portion 2130, ear canal portion 2132, and speaker opening 2134. Ear bud 2104 receives a signal from processing chip set 2118 and converts that signal into an auditory signal through a speaker that is internal to ear bud 2104. This auditory signal exits through speaker opening 2134 into the user's ear. Ear bud 2104 includes a battery (not shown) and a communication interface that allows it to communicate with the communication interface of processing chip set 2118.

Figure 23:
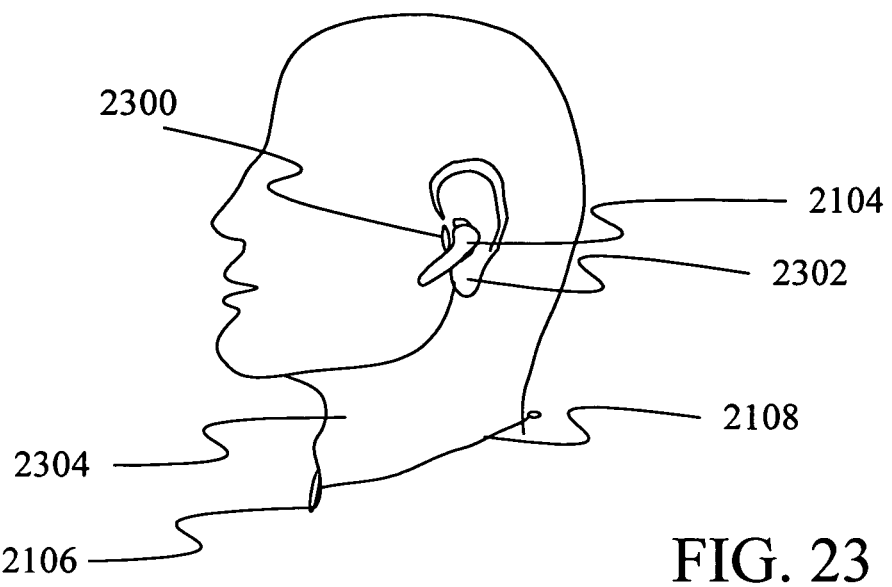
FIG. 23 shows the necklace of FIG. 21 positioned on a user.

As shown in FIG. 23, neck engaging piece 2108 goes around a user's neck 2304 to place pendant 2106 in contact with the front of the user's neck slightly below the thyroid cartilage of the larynx, commonly referred to as the "Adam's Apple." In this position, accelerometer 2114 detects movement of the user's neck caused by vibrations of the vocal cords. Ear bud 2104 is placed in the user's ear such that exterior portion 2130 extends between the tragus 2300 and the anti-tragus 2302 of the outer ear.

Figure 24:
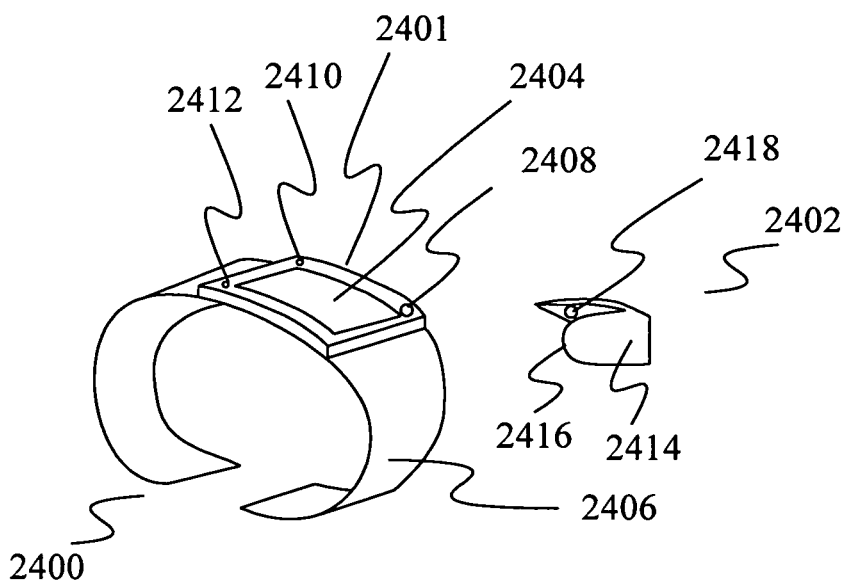
FIG. 24 provides a perspective view of a bracelet/watch and ear bud in which the accelerometer of the present invention may be used.

FIG. 24 provides a pictorial diagram of another embodiment of a mobile device in which an accelerometer of the present invention may be placed. In FIG. 24, the mobile device includes a watch or bracelet 2400 and an ear bud 2402. Watch 2400 includes an enclosure 2401, which is mounted on a wrist engaging piece 2406, such as a band, designed to be secured around the user's wrist. Enclosure 2401 has an interior that holds a set of electronic device, which includes a battery, a processor, memory, a communication interface, an input/output interface, a Global Positioning Satellite receiver, a video camera, speaker, air conduction microphone; pulse sensor, oximetry sensor and temperature sensor. The communication interface allows the processor to communicate with a processor in ear bud 2402 and thereby transmit acoustic information to ear bud 2402 and receive data from an accelerometer 2418 in ear bud 2402. In addition, the communication interface allows for wireless communication with one or more of a router, a personal computer, and other mobile devices.

Enclosure 2401 includes openings corresponding to some of the electronic devices in the enclosure including pulse and oximetry meter opening 2408, air conduction microphone opening 2410, and video camera opening 2412. The pulse and oximetry meter measures the user's pulse when the user places their finger over the meter and also measures the oxygen content of the user's blood using a light source and a light sensor. The exterior of one side of enclosure 2401 also includes a display 2404.

Ear bud 2402 includes an ear portion 2414 designed to be placed in a user's ear canal and a speaker opening 2416. In addition, ear bud 2402 includes an accelerometer 2418, which rests against the user's jaw when the ear bud 2402 is in the user's ear canal.

Figure 25:
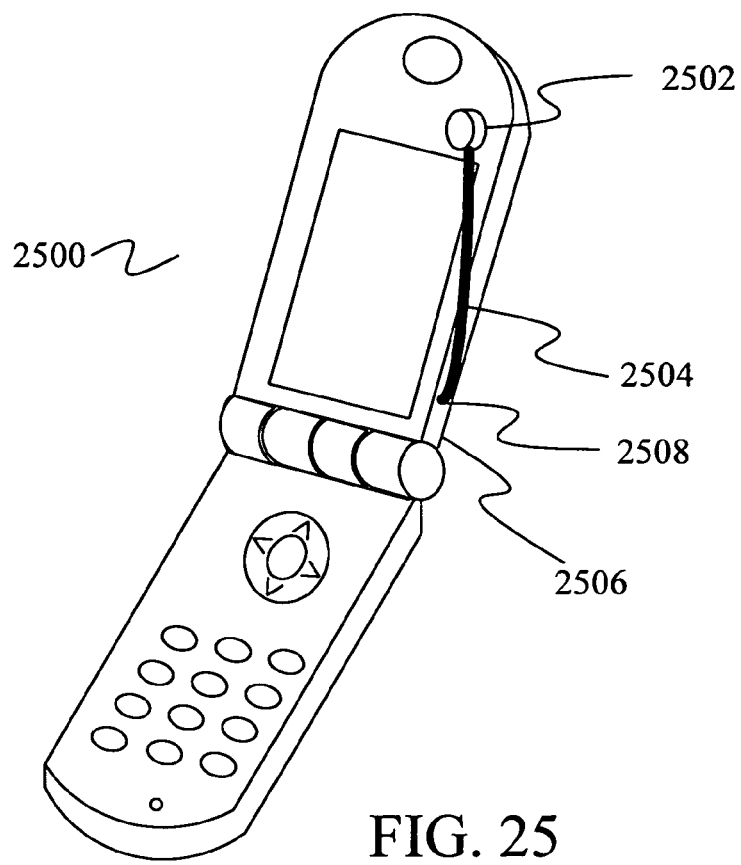
FIG. 25 is a perspective view of a second embodiment of a mobile phone in which an accelerometer of the present invention may be used.
Figure 26:
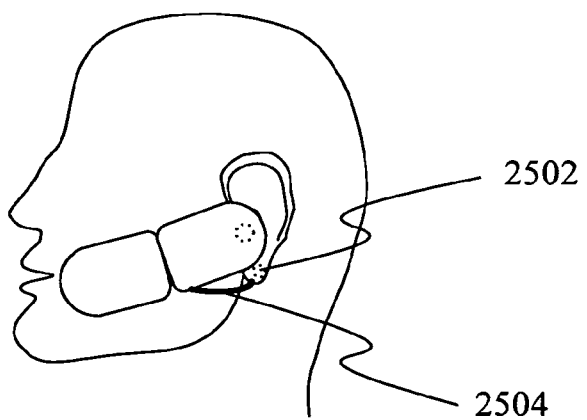
FIG. 26 shows the phone of FIG. 25 in position on the left side of a user's face.

FIG. 25 provides another example of a mobile phone 2500 that can use the accelerometer of the present invention as a bone-conduction microphone. Mobile phone 2500 is similar to mobile phone 1800 of FIG. 18 except that an accelerometer 2502 is provided on the exterior of mobile phone 2500 attached to a flexible stock 2504. As shown in FIG. 26, during use, flexible stock 2504 positions accelerometer 2502 next to the user's skull, just behind the ear lobe. In some embodiments, a clip is provided on mobile phone 2500 to store flexible stock 2500 and accelerometer 2502 when not in use. In other embodiments, flexible stock 2500 is capable of being pushed into and pulled out of casing 2506 of phone 2500 through an opening 2508. In other embodiments, channels are provided in casing 2506 to house flexible stock 2504 and accelerometer 2502 when not in use.

To allow the mobile phone of FIG. 25 to be used by left and right handed people, flexible stock 2504 may be positioned on either side of mobile phone 2500. In some embodiments of the mobile phone, two separate flexible stocks having two separate accelerometers are provided on a single phone.

Figure 27:
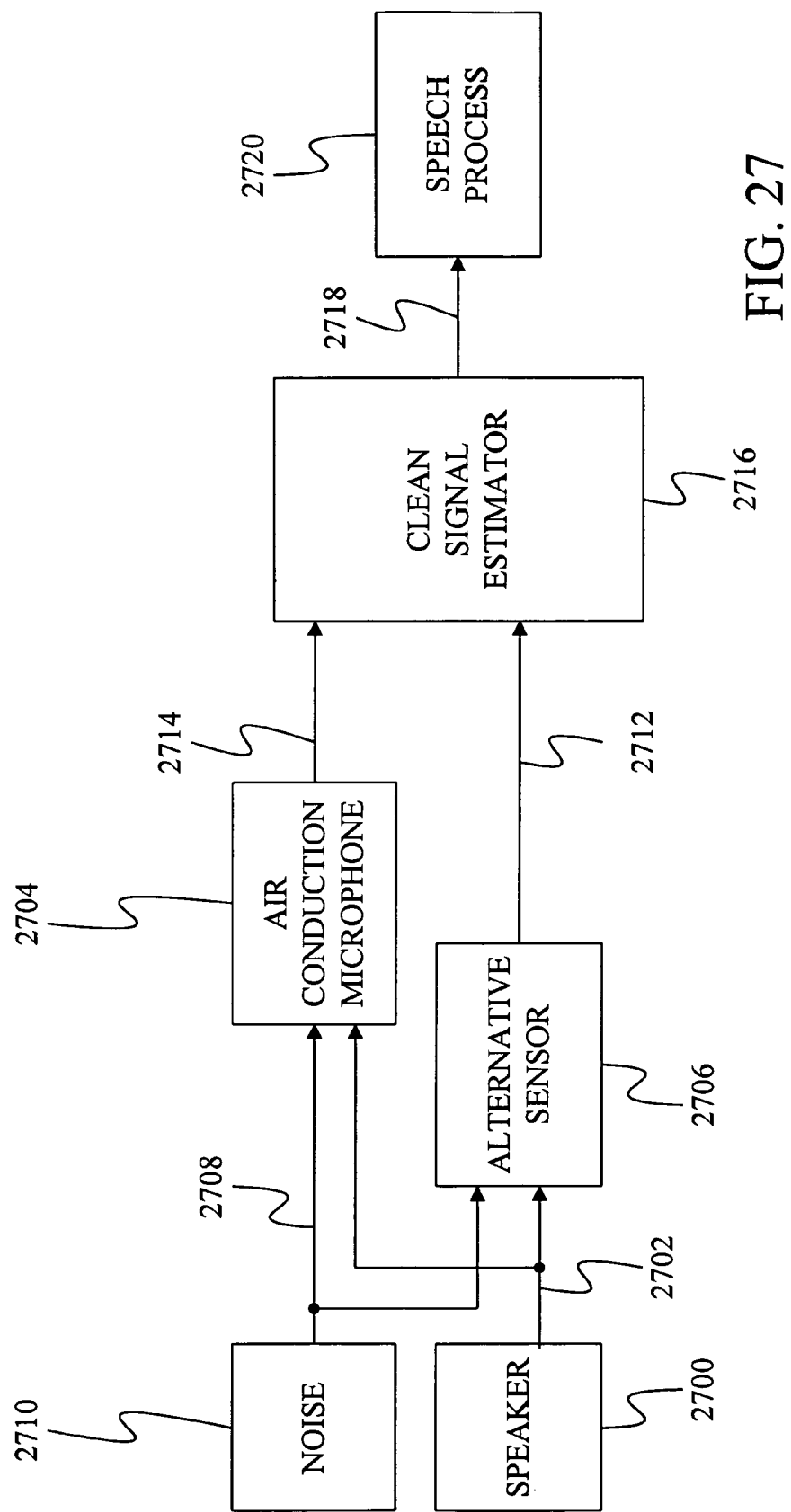
FIG. 27 is a block diagram of a general speech processing system.

Using the accelerometer of the present invention, it is possible to provide an enhanced speech signal. FIG. 27 provides a basic block diagram of a speech processing system that provides an enhanced speech signal using an accelerometer of the present invention.

In FIG. 27, a speaker 2700 generates a speech signal 2702 that is detected by an air conduction microphone 2704 and an accelerometer of the present invention 2706.

Air conduction microphone 2704 also receives noise 2708 generated by one or more noise sources 2710. Depending on the level of the noise, noise 2708 may also be detected by accelerometer 2706. However, under most embodiments of the present invention, accelerometer 2706 is typically less sensitive to ambient noise than air conduction microphone 2704. Thus, the accelerometer signal 2712 generated by alternative sensor 2706 generally includes less noise than air conduction microphone signal 2714 generated by air conduction microphone 2704.

Accelerometer signal 2712 and air conduction microphone signal 2714 are provided to a clean signal estimator 2716, which estimates a clean speech signal 2718 from accelerometer signal 2712 and air conduction microphone signal 2714. Clean signal estimate 2718 is provided to a speech process 2720. Clean speech signal 2718 may either be a filtered time-domain signal or a feature domain vector. If clean signal estimate 2718 is a time-domain signal, speech process 2720 may take the form of a listener, a cellular phone transmitter, a speech coding system, or a speech recognition system. If clean speech signal 2718 is a feature domain vector, speech process 2720 will typically be a speech recognition system.

The present invention utilizes several methods and systems for estimating clean speech using air conduction microphone signal 2714 and accelerometer signal 2712. One system uses stereo training data to train correction vectors for the accelerometer signal. When these correction vectors are later added to a test accelerometer vector, they provide an estimate of a clean signal vector. One further extension of this system is to first track time-varying distortions and then to incorporate this information into the computation of the correction vectors and into the estimation of the clean speech.

A second system provides an interpolation between the clean signal estimate generated by the correction vectors and an estimate formed by subtracting an estimate of the current noise in the air conduction test signal from the air conduction signal. A third system uses the accelerometer signal to estimate the pitch of the speech signal and then uses the estimated pitch to identify an estimate for the clean speech signal. A fourth system uses direct filtering, in which the accelerometer signal and the air conduction signal are used to determine one or more channel responses of the accelerometer. The channel response(s) are then used to estimate the clean speech signal.

Although specific applications for the accelerometer of the present invention have been described, the accelerometer is not limited to these uses and may be used in any application requiring an accelerometer. Another example of a use for the accelerometer is as an activity detector included in mobile devices such as cell phones, pocket computers, laptops and tablet PCs. The activity detector detects a user state such as walking, running, driving, or non-activity. Another application is as a vibration detector for machinery, where the processing of the signals from one or more of these accelerometers is used to determine if the machinery is about to fail. Still another application is real-time feedback for speakers where an accelerometer is mounted on a speaker and provides a feedback signal to the amplifier system.

Although the present invention has been described with reference to particular embodiments, workers skilled in the art will recognize that changes may be made in form and detail without departing from the spirit and scope of the invention.

What is claimed is:

1. A method of manufacturing an accelerometer, the method comprising:
   manufacturing a casing;
   installing an electret, a back plate and an electronic circuit in the casing;
   installing a diaphragm in the casing; and
   sealing the casing to isolate the diaphragm from external acoustic signals.

2. The method of claim 1 wherein sealing the casing comprises placing a plug in a hole of the casing.

3. The method of claim 1 wherein sealing the casing comprises encasing the entire casing within an acoustic insulation material.

4. The method of claim 1 wherein installing the electret, the back plate and the electronic circuit in the casing comprising installing the electret, the back plate and the electronic circuit in the casing in the same manner as for an electret microphone.

5. The method of claim 1 wherein installing a diaphragm comprises modifying a diaphragm designed for an electret microphone.

6. The method of claim 1 further comprising installing a dampening material that is in contact with the diaphragm before sealing the casing.

* * * * *